United States Patent [19]

Medford et al.

[11] Patent Number: 4,988,779
[45] Date of Patent: Jan. 29, 1991

[54] ADDITION CURED SILICONE PRESSURE SENSITIVE ADHESIVE

[75] Inventors: George F. Medford, Ballston Lake; Donald S. Johnson, Scotia, both of N.Y.

[73] Assignee: General Electric Company, Waterford, N.Y.

[21] Appl. No.: 339,041

[22] Filed: Apr. 17, 1989

[51] Int. Cl.$^5$ ............................................. C08F 283/00
[52] U.S. Cl. ................... 525/478; 525/479; 524/315; 524/361; 524/284; 524/366; 524/464; 524/588
[58] Field of Search ............... 525/478, 479; 524/588, 524/464, 366, 361, 284, 315

[56] References Cited

U.S. PATENT DOCUMENTS

| 2,676,182 | 4/1954 | Daudt et al. | 260/448.2 |
|---|---|---|---|
| 3,159,601 | 12/1964 | Ashby | 260/46.5 |
| 3,159,662 | 12/1964 | Ashby | 260/448.2 |
| 3,188,299 | 6/1965 | Chalk | 260/46.5 |
| 3,188,300 | 6/1965 | Chalk | 260/46.5 |
| 3,192,181 | 6/1965 | Moore | 260/46.5 |
| 3,220,970 | 11/1965 | Carlstrom et al. | 524/188 |
| 3,220,972 | 11/1965 | Lamoreaux | 260/46.5 |
| 3,284,406 | 11/1966 | Nelson | 260/46.5 |
| 3,344,111 | 9/1967 | Chalk | 260/46.5 |
| 3,383,356 | 5/1968 | Nielson | 260/46.5 |
| 3,445,420 | 5/1969 | Kookootsedes et al. | 260/37 |
| 3,453,233 | 7/1969 | Flatt | 260/46.5 |
| 3,453,234 | 7/1969 | Kookootsedes et al. | 260/46.5 |
| 3,516,946 | 6/1970 | Modic | 252/429 |
| 3,532,649 | 10/1970 | Smith et al. | 260/18 |
| 3,627,851 | 12/1971 | Brady | 260/825 |
| 3,814,730 | 6/1974 | Karstedt | 260/46.5 |
| 3,983,298 | 9/1976 | Hahn et al. | 428/355 |
| 4,340,710 | 7/1982 | Brown, Jr. | 528/15 |
| 4,510,094 | 4/1985 | Drahnak | 556/470 |
| 4,774,297 | 9/1988 | Murakami et al. | 525/478 |

FOREIGN PATENT DOCUMENTS 972594 10/1964 United Kingdom .

OTHER PUBLICATIONS

European Patent Application (Murakami et al.), 0269454, Date of Publication 06/01/88.

Primary Examiner—Melvyn I. Marquis
Attorney, Agent, or Firm—M. R. Warfield

[57] ABSTRACT

Compositions curable to pressure sensitive adhesives are disclosed which comprise from 30 to 50 parts of a vinyl endblocked polydiorganosiloxane fluid having a viscosity from 500 to 10,000 centipoise at 25° C., from 50 to 70 parts of a benzene soluble resin copolymer having $R_3SiO_{\frac{1}{2}}$ units and $SiO_{4/2}$ units, an organopolysiloxane having silicon bonded hydrogen atoms for the purpose of curing the composition and developing the PSA properties, and a platinum catalyst for the curing process.

22 Claims, No Drawings

ADDITION CURED SILICONE PRESSURE SENSITIVE ADHESIVE

This invention relates to polyorganosiloxane compositions that are curable to produce pressure sensitive adhesives and to methods of making the cured compositions. This invention also relates to the articles comprising a support carrying the cured compositions of this invention.

BACKGROUND OF THE INVENTION

The term, pressure sensitive adhesive, as used herein refers to adhesives that can be adhered to a surface and yet can be stripped from said surface without transferring more than trace quantities of adhesive to the surface, and can be readhered to the same or another surface because the adhesive retains some or all of its tack and adhesive strength.

Pressure sensitive adhesives, hereinafter also referred to as PSAs, comprising polyorganosiloxanes are not new. Mixtures of a benzene soluble resin copolymer comprising $R_3SiO_{\frac{1}{2}}$ units and $SiO_{4/2}$ units, hereinafter also referred to as MQ resin, M units, and Q units respectively, and a vinyl endblocked polydiorganosiloxane have been disclosed, which have PSA characteristics. U.S. Pat. Nos. 3,983,298 and 4,774,297 teach such mixtures. U.S. Pat. No. 3,983,298 points out that compositions of the prior art based on mixtures of MQ resins and low viscosity silicones do not form pressure sensitive adhesive compositions and then teaches that the use of mixtures of such benzene soluble resins with higher molecular weight linear vinyl functional polysiloxane having viscosities of 20-100,000 centipoises does form PSA's. U.S. Pat. No. 4,774,297 also teaches the preparation of PSA's utilizing vinyl functional polysiloxanes of still higher molecular weight with organopolysiloxane resins. In order to obtain satisfactory products, U.S. Pat. No. 4,774,297 teaches that it is essential that the vinyl functional polysiloxane have a viscosity of at least 500,000 centipoise and preferably at least 1,000,000 centipoise. The compositions of U.S. Pat. Nos. 3,983,298 and 4,774,297 both require solvent for the purpose of reducing viscosity of the PSA to a usable level. In particular, U.S. Pat. No. 4,774,297 requires about 25 to 400 parts of solvent per 100 parts of PSA composition. U.S. Pat. No. 3,983,298 requires less solvent, but when 95 parts of composition are blended with 5 parts of solvent the viscosity remains 162,000 centipoise at 25° C. This is rather greater than is usually desired. At 90-95% solids a viscosity of less than 100,000 and preferably less than 30,000 is desirable.

The PSA art still requires a polyorganosiloxane PSA having high tack, good adhesive strength, and low solvent content. In light of the foregoing it was unexpected to obtain these desirable qualities by using low viscosity vinyl-functional polysiloxanes in critical combinations and curing the resulting mixture.

SUMMARY OF THE INVENTION

It is a primary object of this invention to provide a polyorganosiloxane PSA having a high tack and good adhesive strength. It is another object of this invention to provide a high performance polyorganosiloxane PSA that needs very little solvent to aid in its workability.

This invention relates to a composition of matter having, in the cured state, a tack of greater than 200 g/cm², preferably greater than 400 g/cm², a peel adhesion strength greater than 20 ounces/inch, preferably greater than 40 ounces/inch, and generally requiring no more than about 5-10 percent by weight of solvent to improve workability in the uncured state. Such compositions comprise a vinyl-functional polydiorganosiloxane fluid, a benzene soluble resin copolymer having $R_3SiO_{\frac{1}{2}}$ units and $SiO_{4/2}$ units, an organopolysiloxane having silicon bonded hydrogen atoms for the purpose of curing the composition and developing the PSA properties, and a platinum catalyst for the curing process.

DESCRIPTION OF THE INVENTION

This invention relates to a composition, suitable for use as a pressure sensitive adhesive, obtained by mixing components comprising:

(a) from about 50 to about 70 parts by weight of one or more benzene soluble resin copolymers comprising $R_3SiO_{\frac{1}{2}}$ units and $SiO_{4/2}$ units, where each R individually is a monovalent hydrocarbon radical containing no more than six carbon atoms, there being from 0.6 to 0.9 inclusive $R_3SiO_{\frac{1}{2}}$ units for every $SiO_{4/2}$ unit, at least 95 percent of all R radicals in (a) being methyl and the total number of R radicals in (a) that have olefinic unsaturation being no more than 0.5 percent, preferably zero percent, of all R radicals in (a);

(b) from about 30 to about 50 parts by weight of an essentially cyclic free, polydiorganosiloxane of the average formula $R^1{}_2R^2SiO(R^1{}_2SiO)_m(R^1R^2SiO)_nSiR^2R^1{}_2$ where each $R^1$ individually is a radical selected from the group consisting of methyl, ethyl, propyl, and phenyl, at least 95 percent of all $R^1$ radicals being methyl, each $R^2$ individually is a vinyl radical or any $R^1$ as defined above with the proviso that at least 2 $R^2$ radicals must be vinyl and m+n has an average value such that the viscosity of the polydiorganosiloxane (b) has a value of from about 500 to about 10,000 centipoise at 25° C., the total of (a) and (b) being 100 parts by weight;

(c) an amount of an organopolysiloxane compatible with the mixture of (a) and (b) and having an average unit formula $R^3{}_aH_bSiO_{4-a-b/2}$ where each $R^3$ individually is any $R^1$ radical as defined above, a has a value of from 1.00 to less than 2.00, b has a value of from 0.05 to 1.00, the sum of a plus b being from 1.10 to less than 3.00, there being an average of greater than two silicon bonded hydrogen atoms per molecule of (c), no silicon atom bearing more than one silicon bonded hydrogen atom and the amount of (c) present being sufficient to provide from 1 to 30 silicon bonded hydrogen atoms for every olefinically unsaturated radical in the total of (a) plus (b); and (d) a platinum containing catalyst in sufficient quantity to provide at least 0.1 part by weight platinum for every one million parts by weight of the combined weight of (a), (b), and (c).

All of the individual components of the compositions of this invention, and their combination generally, are well known in the art, but their combination in critical ratios and their curing to yield superior PSAs is not previously known or obvious.

Resin copolymer (a), which is a solid, resinous polyorganosiloxane composed of M units and Q units can be prepared by any of the known methods. For example, cohydrolysis of an appropriate amount of each of the silanes of the formulae

$R_3SiX$ and $SiX_4$ to give M units and Q units respectively in the desired M/Q ratio in the resin copolymer (a) can be used when X is a hydrolyzable group such as alkoxy. Preferably, resin copolymer (a) is prepared by the method of Daudt and Tyler, U.S. Pat. No. 2,676,182 which is hereby incorporated by reference, to show the method of preparation and the compositions that are obtainable. Briefly, the method of Daudt and Tyler comprises reacting under acidic conditions, a silica hydrosol with organosubstituted siloxanes, for example, hexamethyldisiloxane, or hydrolyzable organosubstituted silanes, for example, trimethylchlorosilane, or their mixtures and recovering a resin copolymer having M and Q units which is soluble in aromatic solvents.

Regardless of the method of preparation, the weight of the resin copolymer (a) and the ratio of M units to Q units in the resin copolymer (a) that is used in this invention is based on the non-volatile portion of the resin copolymer. To determine the non-volatile portion of the resin copolymer a known weight of resin copolymer, as prepared, preferably dissolved in volatile solvent such as toluene or xylene, is heated at 150° C. for 45 minutes to yield a non-volatile residue. The amount of the non-volatile portion of the resin copolymer is often based on the weight of the organic solvent solution of the resin copolymer and is expressed as "percent solids".

The R groups in the M units of (a), which may be identical or different, are monovalent hydrocarbon radicals containing no more than six carbon atoms such as alkyl radicals such as methyl, ethyl, and isopropyl; cycloaliphatic radicals such as cyclopentyl and cyclohexenyl; olefinic radicals, such as vinyl and allyl; and the phenyl radical. Typical M units are

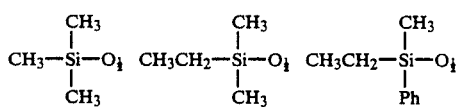

where Ph is, above and hereinafter, the phenyl radical. It is preferred that at least 95 percent of all the R radicals in (a) are methyl and that essentially all of the radicals are free of olefinic unsaturation. Up to 0.5 percent of all R radicals in (a) can be olefinically unsaturated, such as vinyl. More preferably the number of unsaturated R radicals in (a) can range from 0 to 0.2 percent of all R radicals in (a).

The Q units in (a) are essentially all siloxane units, containing no silicon bonded carbon atoms and are derived directly from the silica hydrosol in the preferred method of Daudt and Tyler. It should be understood that the resin copolymers (a) that are operable in this invention often have as much as 3 to 4 percent by weight, based on the total weight of (a), of hydroxyl radicals bonded directly to the silicon atom of the Q units, the actual amount of said hydroxyl radicals being dependent upon the method of preparation of the resin copolymer.

Resin copolymers (a) that are operable in the invention are soluble in aromatic solvents such as benzene, toluene, xylenes and the like and have a ratio of M units to Q units whose value is from 0.6:1.0 to 0.9:1.0. The M/Q radio in (a) can be determined by one or more standard analytical techniques such as elemental analysis, infra-red spectroscopy, nuclear magnetic resonance spectroscopy, etc. For example, in a resin copolymer having only trimethylsiloxane units and silica units, a knowledge of the percent by weight of carbon in the resin copolymer (a) is sufficient to establish its M/Q ratio.

The best PSAs of this invention are obtained when copolymer (a) consists essentially of

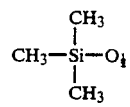

units and $SiO_{4/2}$ units in the stated ratio. It is to be understood that trace amounts of diorganosiloxane units and monoorganosiloxane units are within the scope of this invention as components in resin copolymer (a).

Vinyl-functional polydiorganosiloxanes (b) may be any of the linear polysiloxanes of the average formula

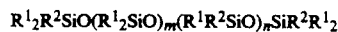

where $R^1$ and $R^2$ have the meaning given above, with the proviso that at least 2 $R^2$ radicals are vinyl and where the sum m+n has a value such that the polysiloxane has a viscosity of 500 to 10,000 centipoise at 25° C.

Particularly preferred as polydiorganosiloxanes (b) are the well known vinyl endblocked siloxanes of the average formula

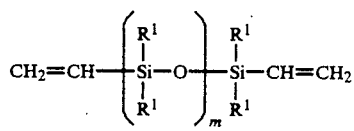

where $R^1$ is as above, and m has a value such that the polysioxane has a viscosity of 500 to 10,000 centipoise at 25° C.

Polydiorganosiloxanes (b) can be prepared by any of the conventional methods for preparing triogranosiloxane terminated polydiorganosiloxanes. For example, a proper ratio of the appropriate hydrolyzable silanes, e.g. vinyldimethylchlorosilane and dimethyldichlorisilane, may be cohydrolyzed and condensed or alternately an appropriate 1,3-divinyldimethyldiphenyldisiloxane, which furnishes the endgroups of the polydiorganosiloxane, may be equilibrated with an appropriate diorganopolysiloxane e.g. octamethylcyclotetrasiloxane, in the presence of an acidic or basic catalyst. Regardless of the method of preparation of polydiorganosiloxane (b) there is usually coproduced a varying quantity of volatile, cyclic polydiorganosiloxanes. The amount used of polydiorganosiloxane (b), its average formula, and its viscosity, for the purpose of this invention, refers to the essentially cyclic free portion of the polydiorganosiloxane. This essentially cyclic free portion can be prepared by stripping the polydiorganosiloxane at 150° C. for 3 hours to yield a residue. This residue will be essentially free of cyclic material with the exception of trace quantities of macrocyclic polydiorganosiloxanes which are non-volatile at 150° C. and atmospheric pressure. Many of these polydiorganosiloxanes (b) are commercially available. Furthermore, component (b) can be homopolymers or copolymers of the stated average formula.

The terminal units of the preferred form of component (b) are triorganosiloxane units in which one of the organic groups is a vinyl group that is bonded directly to the silicon atom of the terminal unit. The two $R^2$ radicals in each terminal unit of (b) are any of the $R^1$ radicals defined above, but are preferably selected from the group consisting of methyl and phenyl. Preferred terminal units for siloxane (b) are vinyldimethylsiloxy units.

The polymer chain of the preferred form of polydiorganosiloxane (b), exclusive of terminal units, is made up of diorganosiloxane units containing $R^1$ radicals which can all be identical or a mixture of $R^1$ radicals. Trace amounts of $R^1{}_3SiO_{\frac{1}{2}}$ units, $R^1SiO_{3/2}$ units and $SiO_{4/2}$ units are permissible in (b). $R^1$ is selected from the group consisting of methyl, ethyl, propyl, and phenyl, with at least 95 percent, and preferably 100 percent of all $R^1$ in (b) being the methyl radical.

The value of n is such that the viscosity of component (b) is between 500 and 10,000 centipoises when measured at 25° C. Depending on the type of $R^1$ radicals in (b) the permissible average value of n will vary.

Component (c) is an organopolysiloxane of the average unit formula

having silicon bonded hydrogen atoms that are reactive with silicon bonded vinyl radicals in the presence of a platinum catalyst. $R^3$ can be any $R^1$ radical as defined above, but preferably $R^3$ is methyl or phenyl. In order to be effective for this invention, component (c) must be compatible with, and preferably soluble in, the mixture of (a) and (b). By "compatible", it is meant that the required amount of organopolysiloxane (c) is at least partially soluble in the mixture of (a) and (b) and will exist in a uniformly dispersed state in the compositions of this invention while participating in the curing reaction, until the cure has been effected.

In component (c), a has a value of from 1.00 to less than 2.00, b has a value of from 0.05 to 1.00 and the sum of a plus b has a value of from 1.10 to less than 3.00. Furthermore, component (c) must have an average of greater than 2, for example 2.1, 2.5, 3.5, 10, or more, preferably, at least 3 silicon bonded hydrogen atoms per molecule, no silicon atom bearing more than one silicon bonded hydrogen atom.

Illustrative of component (c) which are operative in the present invention are fluid polyorganosiloxanes such as

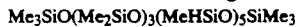

and their several mixtures, including their mixtures with other organopolysiloxanes having less than three silicon bonded hydrogen atoms per molecule; fluid siloxane copolymer resins comprising of $SiO_{4/2}$ units, $Me_3SiO_{\frac{1}{2}}$ units and units such as, $Me_2HSiO_{\frac{1}{2}}$, $MeHSiO_{2/2}$, and $Me_2SiO_{2/2}$, etc.; and the mixtures of fluid polyorganosiloxanes and fluid siloxane copolymer resins described in U.S. Pat. No. 3,627,851. These latter compositions (known as $M^HQ$ resins) comprise dimethyl hydrogen siloxy unit ($M^H$ units) trimethylsiloxy units (M units) and $SiO_2$ units (Q units) where the ratio of dimethylhydrogensiloxy units ($M^H$) units to Q units is 0.4:1.0 to 1.2:1.0 inclusive, the ratio of M units to Q units is from 1.5:1.0 to 2.2:1.0 and the ratio of $M^H$ and M units to Q units is from 2.4:1.0 to 3.0:1.0. Organopolysiloxanes (c) that having at least one $R^3$ group, preferably a methyl group, bonded to the silicon atoms that bear the reactive hydrogen atoms are preferred. It is to be understood that component (c) can be a single compound or a mixture of compounds as long as the average unit formula is as indicated and the indicated compatibility is realized.

When substantial quantities of $M^HQ$ resins are employed, it is advisable to make certain that the amount of component (a) with relationship to component (b) is reduced, inasmuch as the $M^HQ$ resin will serve to supplement the tack and strength building properties of component (a) (MQ resin) and as the total quantity of the MQ and $M^HQ$ resins approaches and exceeds about 70% of the PSA composition, a loss of tack will be observed.

The platinum catalyst (d) is any of the well known forms of platinum that are effective for catalyzing the reaction of silicon bonded hydrogen atoms with silicon bonded vinyl groups, such as finely divided metallic platinum, platinum on a finely divided carrier such as alumina, compounds of platinum such as chloroplatinic acid and complexed of platinum compounds.

These materials especially include the platinum hydrocarbon complexes described in U.S. Pat. Nos. 3,159,601 and 3,159,662 to Ashby, and the platinum alcoholate catalysts described in U.S. Pat. No. 3,220,970 to Lamoreaux, as well as the platinum catalysts of U.S. Pat. No. 3,814,730 to Karstedt. Additionally, the platinum chloride-olefin complexes described in U.S. Pat. No. 3,516,946 to Modic are also useful herein. All of the aforesaid catalysts are thermally activated. Also useful are the photoactive platinum catalysts such as those of U.S. Pat. No. 4,510,094 to Drahnak. All of the above U.S. patents are incorporated by reference into the present disclosure.

Catalysts (d) that are soluble in the mixture of (a) plus (b) plus (c) are preferred, especially where optical clarity is desired.

In the compositions of this invention resin copolymer (a) is present in from 50 to 70, preferably from 55 to 65 parts by weight and polydiorganosiloxane (b) is present in from 30 to 50, preferably from 35 to 45 parts by weight, and the total of (a) plus (b) is 100 parts. When the resin copolymer (a) is less than 50 percent by weight of the total of (a) plus (b), the PSAs of this invention will not be obtained since the cured composition will have low peel strength. As the resin copolymer (a) approaches 70 percent by weight of the total of (a) plus (b), the viscosity of the uncured composition becomes excessively high and a significant decrease in tack is observed in the cured PSA.

The organopolysiloxane (c) is present in an amount that is sufficient to provide from 1 to 30, preferably at least 5 silicon bonded hydrogen atoms for every olefinically unsaturated radical in the total of (a) plus (b). The number of olefinically unsaturated radicals in (a) and (b) and the number of silicon bonded hydrogen atoms in any given quantity of (c) can be determined by analytical techniques that are standard to the organosilicon art.

The platinum catalyst (d) is present in an amount sufficient to provide at least 0.1 part by weight platinum for one million parts by weight of the combined weight of (a), (b), and (c). Frequently, such small amounts of catalyst are poisoned by trace quantities of impurities in the composition so it is advantageous to employ the platinum catalyst in such quantities to provide at least 1.0 ppm platinum. The amount of platinum catalyst is not critical with respect to the upper limit but its cost would suggest that excessive quantities should be avoided. Amounts of up to 200 ppm platinum are not usual but preferably from 1 to 35 parts by weight of platinum for every one million parts by weight of (a) plus (b) plus (c) is used.

The components of the compositions of this invention can be mixed in any manner such as in bulk or in organic solvent. Since the resin copolymer (a) is a solid and is conveniently prepared and handled in an organic solvent, the preparation of the compositions of this invention preferably employs an organic solvent, at least for the mixing of (a) and (b). The organic solvent can be any of the solvents conventionally used with organosiloxanes and having a boiling point below approximately 250° C., such as aromatic hydrocarbons such as benzene, toluene, and xylene; aliphatic hydrocarbons such as hexane, heptane and cyclohexane; halogenated hydrocarbon solvents such as trichloroethane and chloroform; naphthas such as petroleum ether, VM and P Naphtha and refined naphthas such as Naphthalite 66/3 and oxygenated solvents such as hydrocarbon ethers such as tetrahydrofuran and the dimethylether of ethylene glycol, ketones such as methyl isobutyl ketone and esters such as ethyl acetate, etc. Mixtures of said organic solvents can be also used. Mixing of said component can be accomplished by any of the techniques that are known in the polymer art such as milling, blending, stirring, etc., either in batch or in continuous process.

The compositions of this invention are obtained whenever the components (a), (b), (c), and (d) are mixed together in the stated proportions. The order of mixing of the components is not critical, except that the platinum catalyst (d) is preferably added last.

The best method of preparing the compositions of this invention is to mix the resin copolymer which may be dissolved in about an equal weight of an organic solvent to facilitate mixing, with the polydiorganosiloxane. In this best method a sufficient quantity of the resin copolymer solution, whose non-volatile content is known is used for the non-volatile resin copolymer (a). In like manner, a sufficient quantity of polydiorganosiloxane, whose essentially cyclic free content has been determined, is used to contain the desired weight of essentially cyclic free polydiorganosiloxane (b). Of course, the non-volatile resin copolymer (a) and/or the essentially cyclic free polydiorganosiloxane (b) can be prepared separately and then mixed, with or without the aid of solvent. To obtain compositions having at least 90% and preferably about 95% solids the resin copolymer and the polydiorganosiloxane should be devolatilized under conditions equivalent to heating for 3 hours at 150° C. an atmospheric pressure in order to obtain optimum PSA properties. Obviously, excessively high temperatures should be avoided when components (a) and (b) or their mixtures are being devolatilized. A temperature of 200° C., and preferably 150° C., should not be exceeded. The mixture of (a), (b), and solvent is conveniently devolatilized in thin film at 150° C. at a pressure of about 8 mm of mercury. Additional solvent may be added to the cooled, devolatilized mixture of (a) and (b) to obtain a desired viscosity. Organopolysiloxane (c), and catalyst (d) are added to the devolatilized mixture of (a) and (b) to complete the composition and curing of the composition will begin, unless a platinum catalyst inhibitor described below has been added. The platinum catalyst inhibitor, if added, is best added to the cooled, devolatilized mixture of (a) and (b).

Small amounts of additional ingredients may be added to the compositions of this invention if desired. For example, antioxidants, pigments, stabilizers, fillers, etc., may be added as long as they do not materially reduce the PSA properties of these compositions. Volatile additives are preferably added after any solvent removal operations have been completed.

When components (a), (b), (c), and (d), are mixed, the composition begins to cure at a rate which is directly proportional to the temperature of the composition. The compositions of this invention can be cured at room temperature or cured by heating. When heat curing is employed, a temperature from about 70° to 200° C., preferably from 100° to 150° C., is employed, whereupon curing proceeds in about one hour or less. If curing is carried out at too high a temperature, or for too long a period, a loss of the desired tack and peel may occur. Simple experimentation may be required to determine the optimum cure time/temperature for a particular formulation. When photosensitive platinum catalysts are used, curing commences upon exposure to radiation of an appropriate wavelength. The exceptional PSA characteristics of these compositions are developed when the composition is cured and the cured composition is essentially free of organic solvent.

Preferably the uncured compositions of this invention should be used within a few hours after being prepared, although this time interval from preparation to use, otherwise known as "shelf life", can be extended to several days by cooling the mixture to a temperature of −20° C. or below. Equally long or longer "shelf life" can be realized by mixing a platinum catalyst inhibitor with the curable mixture.

Platinum catalyst inhibitors which are useful in the compositions of this invention and which display varying lengths of cure time inhibition in the compositions of the invention are those described in U.S. Pat Nos. 3,188,299, 3,188,300, 3,192,181, 3,344,111, 3,383,356, 3,445,420, 3,453,233, 3,453,234, 3,532,649, 4,340,710, and others which may be known in the art.

The effectiveness of a platinum catalyst inhibitor depends on many factors such as its chemical composition, its physical properties, its concentration, etc. For the purposes of this invention an effective amount of any particular platinum catalyst inhibitor can be determined by routine experimentation. Since many platinum catalyst inhibitors are relatively volatile it is preferable to add them to the compositions of this invention after any heating and/or vacuum operations of the preparative process have been completed. For maximum effectiveness, however, a platinum catalyst inhibitor should be added to the compositions of this invention at least simultaneously with, and preferably prior to the mixing of components (c) and (d).

The compositions of this invention, when containing a platinum catalyst inhibitor, can be cured by removing the inhibitor, for example, by evaporation at room temperature or higher. Curing can also be accomplished in most cases by heating the compositions to a temperature of from 70° to 200° C., preferably from 100° to 150° C.

A preferred form of this invention is a mixture of (a), (b), (c), and (d), curable with heat, and having a platinum catalyst inhibitor in an amount effective to inhibit the catalyst action of the platinum containing catalyst below a temperature of approximately 70° C.

The uncured compositions of this invention can be used as a solution in one or more of the organic solvents described above or said compositions can be used with no solvent present. While it is possible to use as much as 50 percent and more of an organic solvent, it is usually sufficient and preferred to employ no more than 10 percent, and frequently as little as about 5 percent by weight, based on the total weight of the composition, of one or more of the organic solvents described above to aid in the application of said compositions. This can be accomplished most easily merely by not removing all of the solvent that is used in the preparation of said compositions. Alternately, all of the solvent that is used in the preparation of the compositions of this invention can be removed and the desired amount of the same or another solvent can be added subsequently. It will be obvious to those skilled in the art that in the case where the solvent that is used to aid in the application of the compositions of this invention has a higher boiling point than the solvent used in their preparation, the necessary solvent change can be accomplished in two steps as described above or in a one step process wherein the higher boiling point solvent is present in the mixture during the removal of the lower boiling solvent. If, during the preparation of the compositions of this invention, any portion of the solvent is removed, particularly if heat and/or vacuum is used to remove said solvent, it is preferred to remove said solvent prior to the addition of other volatile components or component (c). Said removal of solvent can be accomplished by any of the known techniques such as entertainment in a stream of inert gas, evaporation, distillation, thin film stripping, etc., and at any combination of temperature and pressure where the temperature is not allowed to exceed approximately 200° C., preferably about 150° C.

The compositions of this invention are useful as pressure sensitive adhesives and will readily stick to a solid support, whether flexible or rigid. The composition is simply applied to a surface of the support by any suitable means such as rolling, spreading, spraying, etc., and cured as described above. It should be understood that the use of the compositions of this invention encompasses not only the application of the completed, uncured composition on said surface. For example, it is within the scope of this invention to apply a layer of a mixture of (a), (b), and (d) to a solid support and then add the organopolysiloxane (c), the needed mixing being accomplished by diffusion of (c) into the layer of (a), (b), and (d). It is preferred to delay the curing reaction until (c) is thoroughly diffused into the layer on the support. Any solvent that is present in the cured composition is preferably allowed to evaporate before the surface bearing the composition is adhered to a substrate, although this is not necessary.

The surface of the support and the substrate to which the support is adhered may be any known solid material such as metals, such as aluminum, silver, copper, iron and their alloys; porous materials such as paper, wood, leather, and fabrics; organic polymeric materials such as polyolefins, such as polyethylene and polypropylene, fluorocarbon polymers such as polytetrafluoroethylene and polyvinylfluoride, silicone elastomers, silicone resins, polystyrene, polyamides such as Nylon, polyesters and acrylic polymers; painted surfaces; siliceous materials such as concrete, bricks, cinderblocks, and glass such as glass cloth; etc. Porous materials such as glass cloth are often impregnated with a substance that will prevent the migration of the PSA from one surface to another surface of the support. It is also well known to chemically treat the surface of a fluorocarbon polymer support to enhance the adhesion of a PSA to said surface.

Solid supports bearing the cured compositions of this invention are reliably adhered to any solid substrate because said compositions possess the desirable combination of high tack and good adhesive strength.

Useful articles which can be prepared with the PSAs of this invention include pressure sensitive adhesive tapes, labels, emblems and other decorative or informative signs, etc. An especially useful article is one comprising a support, flexible or rigid, that can withstand extreme temperatures, hot and/or cold, and carrying on at least one surface thereof, the polyorganosiloxane PSAs of this invention. Such an article makes full use of the stability at high temperatures and the flexibility at low temperatures that the PSAs of this invention possess.

A preferred article is a pressure sensitive adhesive tape comprising an impregnated glass cloth, a polyester polymer, or a chemically treated fluorocarbon polymer support carrying on at least one surface thereof the cured compositions of this invention.

In order that those skilled in the art may better understand the present invention, the following examples are given to illustrate but not to limit the invention which is fully delineated by the appended claims.

EXPERIMENTAL

The materials utilized in all Examples were as follows, except as otherwise specified.

"MQ Resin" is a 60% by weight solution of a resin prepared by condensing trimethylsilyl chloride with an aqueous silica sol substantially as taught in U.S. Pat. No. 2,676,182 in either toluene or xylene.

"$M^HQ$ Resin" is a liquid resin containing 1 mole percent hydrogen, prepared by condensing dimethylsilyl chloride with an aqueous silica sol substantially as taught in U.S. Pat. No. 3,627,851.

"Methylhydrogen Fluid" is a low-viscosity methylhydrogensiloxy-containing polydimethylsiloxane fluid having 0.25 mole percent hydrogen.

"Vinyl Fluid" is a substantially cyclic-free vinyldimethylsiloxy-endstopped polydimethylsiloxane containing approximately 0.02 mole percent vinyl and having a nominal viscosity of about 4000 centipoise at 25° C.

"Catalyst" is a platinum catalyst containing about 3.5 weight percent platinum prepared substantially as taught in U.S. Pat. No. 3,220,970.

In Examples 1–7 experimental PSAs were prepared by simple mixing of the stated quantities of materials and drawing down portions to a normal thickness of about 2 mils on 1-2 mil Mylar film using a wire-wound rod, and then curing the sample as specified.

Peel adhesion was determined using a Scott Tester, using 180° pull at a rate of 12 in/min.

Tack was measured on cured, unadhered PSA applied at a thickness of 2 to 3 mil to 1-2 mil Mylar film. A Polyken Probe Tack Tester, manufactured by Testing Machines Incorporated, was fitted with a 0.5 cm probe and operated at a 1 cm/sec rate.

EXAMPLE 1

A mixture of $M^HQ$ Resin (1.0 g), MQ Resin (67 g), Methylhydrogen Fluid (13.6 g) and 25 g of a dimethylvinyl endstopped polydimethyl siloxane containing 0.11 mole percent vinyl and having a viscosity of 800 centipoise was prepared. A 10 gram portion of this mixture was catalyzed with 10 microliter Catalyst, and drawdowns were prepared. After drying 1 minute at 90° C. and 2 additional minutes at 160° C. a peel of 4 oz/in and a tack of 275 g/cm$^2$ were determined.

EXAMPLE 2

A mixture of $M^HQ$ Resin (0.81 g), MQ Resin (55 g), Vinyl Fluid (25 g) and Methylhydrogen Fluid (1.0 g) was prepared. A 10 gram portion was catalyzed with 10 microliter Catalyst, and drawdowns were prepared. After drying 1 minute @ $\pi$° C. and an additional 2 min 169 160° C., a peel of 37 oz/in and a tack of 600 g/cm$^2$ were determined.

EXAMPLE 3

A mixture of $M^HQ$ Resin (1.0 g), MQ Resin (10.22 g), Vinyl Fluid (7 g) and Methylhydrogen Fluid (0.4 g) was prepared, catalyzed with 10 microliter Catalyst, and drawdowns were prepared. After curing as above a tack of about 500 and peel of 10-12 were determined. In this preparation the MQ Resin was 47% of the total of MQ Resin and Vinyl Fluid. Although the tack was high, the peel was lower than is desired.

A second sample was prepared using 2.0 g $M^HQ$ Resin, 12.0 g MQ Resin, 7.0 g Vinyl Fluid, 0.4 g Methylhydrogen Fluid, and 10 microliter Catalyst. Following curing as above, a peel of 23-33 and a tack of about 500 were determined. In this preparation the MQ Resin was 51% of the total MQ Resin and Vinyl Fluid. It is evident that raising the level of MQ Resin increased the peel to a more desirable level.

EXAMPLE 4

A sample was prepared using 1.66 g $M^HQ$ Resin, 12.12 g MQ Resin, 3.0 g Vinyl Fluid, 0.14 g Methylhydrogen Fluid and 10 microliter Catalyst. After curing drawdowns as above, such slight tack was observed that peel was not determined. In this preparation the MQ Resin was 71% of the total of MQ Resin and Vinyl Fluid.

A second sample was prepared using 0.66 g $M^HQ$ Resin, 10.34 g MQ Resin, 3.0 g Vinyl Fluid, 0.14 g Methylhydrogen Fluid and 10 microliter Catalyst. After curing drawdowns as before, a peel of 92 was observed. In this preparation the MQ Resin was 67% of the MQ Resin plus Vinyl Fluid.

It can be seen that decreasing the amount of MQ Resin improved the results significantly.

EXAMPLE 5

A PSA was prepared using 0.66 g $M^HQ$ Resin, 11.56 g MQ Resin, 4.34 g Vinyl Fluid 0.21 g Methylhydrogen Fluid, and 10 microliter Catalysts, an MQ resin content of about 61%. Drawdowns were cured as above and a tack of about 750 and a peel of 65-68 were determined.

EXAMPLE 6

A PSA was prepared using 0.77 g $M^HQ$ Resin, 11.23 g MQ Resin, 4.35 g Vinyl Fluid, 0.23 Methylhydrogen Fluid, and 10 microliter Catalyst, a MQ Resin content of about 61%. Drawdowns were cured as above and a tack of about 800 and a peel of 60-63 were determined.

EXAMPLE 7

A series of PSAs was prepared following the formulation of Example 5, except that the silicon hydride source was varied. The total ratios of silicon hydride to vinyl (8.1:1) and total resins to total fluids (62.5%) were held constant. The results are tabulated below (ingredients are in grams).

| $M^HQ$ | MQ | Vinyl | MeH Fluid | Tack | Peel |
|---|---|---|---|---|---|
| 0.67 | 11.56 | 4.35 | 0.21 | 450 | 62 |
| 0.70 | 11.56 | 4.34 | 0 | 249 | 65 |
| 0 | 19.2 | 4.33 | 2.80 | 550 | 62 |

In this particular formulation it is apparent that better results are obtained when at least some of the silicon hydride is derived from a methylhydrogen fluid as compared to a methylhydrogen resin.

EXAMPLE 8

A sample was prepared by mixing 10.5 g Methylhydrogen Fluid, 217 g Vinyl Fluid, 33 g $M^HQ$ Resin, and 578 g MQ Resin. The mixture was stripped at about 20 mm Hg pressure until a pot temperature of 50° C. was reached. The resulting mixture has a viscosity of 62,000 centipoise at 25° C. and contained 94.3% solids. A portion of this mixture was adjusted to 93.1% solids by the addition of toluene. This mixture has a viscosity of 19,500 centipoise at 25° C.

A 10 g portion of the 93.1% solids mixture was catalyzed with 10 microliters of Catalyst. Drawdowns were cured 90 sec. @ 95° C. plus 120 sec @ 120° C. The tack was determined to be about 1100, and the peel 65-70. Additional drawdowns were cured @ 165° C. for 30 minutes. These latter samples showed a tack of only 50 and a peel of 17-22. It is evident that the cure of the latter samples was excessive, and let to severe degradation of the PSA properties.

Those skilled in the art will recognize that various modifications and alterations of the invention are possible without departing from the scope and spirit of the invention, and it is to be understood that the invention is not limited to the illustrative embodiments set forth.

That which is claimed is:

1. A composition suitable for use as a pressure sensitive adhesive and having, in the cured state, a tack of greater than 200 g/cm$^2$ and a peel adhesion strength greater than 20 ounces/inch,
   (a) from 50 to 70 parts by weight of a solid, benzene soluble resin copolymer consisting essentially of $R_3SiO_{\frac{1}{2}}$ units and $SiO_{4/2}$ units where each R individually is a monovalent hydrocarbon radical containing no more than six carbon atoms, there being from 0.6 to 0.9 inclusive $R_3SiO_{\frac{1}{2}}$ units for every $SiO_{4/2}$ units, at least 95 percent of all R radicals in (a) being methyl and the total number of R radicals in (a) that have olefinic unsaturation being 0–0.5 percent of all R radicals in (a), (b) from about 30 to about 50 parts by weight of an essentially cyclic free, polydiorganosiloxane of the average formula $$R_2{}^1R^2SiO(R_2{}^1SiO)_m(R^1R^2SiO)_nSiR^2R_2{}^1$$

where each $R^1$ individually is a radical selected from the group consisting of methyl, ethyl, propyl, and phenyl, at least 95 percent of all $R^1$ radicals being methyl, each $R^2$ individually is a vinyl radical or any $R^1$ as defined above with the proviso that at least 2 $R^2$ radicals must be vinyl and m+n has an average value such that the viscosity of the polydiorganosiloxane (b) centipoises at 25° C., the total of (a) and (b) being 100 parts by weight;

(c) an amount of an organopolysiloxane which is at least partially soluble in the mixture of (a) and (b) and having an average unit formula $$R^3{}_aH_bSiO_{(4-a-b)/2}$$

where each $R^3$ individually is any $R^1$ radical as defined above, a has a value of from 1.00 to less than 2.00, b has a value of from 0.05 to 1.00, the sum of a plus b being from 1.10 to less than 3.00, there being an average of greater than two silicon bonded hydrogen atoms per molecule of (c), no silicon atom bearing more than one silicon bonded hydrogen atom and the amount of (c) present being sufficient to provide from 1.0 to 30.0 silicon bonded hydrogen atoms for every olefinically unsaturated radical in the total of (a) plus (b) and, (d) a platinum containing catalyst in sufficient quantity to provide at least 0.1 part by weight of the combined weight of (a), (b), and (c).

2. A composition according to claim 1 wherein substantially all R radicals in (a) are methyl.

3. A composition according to claim 1 wherein (b) is a vinyldimethylorganosilyoxy-terminated polydimethylsiloxane.

4. A composition according to claim 1 wherein the organopolysiloxane (c) comprises a linear liquid polysiloxane which contains at least two methylhydrogensiloxy groups.

5. A composition according to claim 1 wherein the platinum containing catalyst (d) is a thermally activated catalyst.

6. A composition according to claim 1 which additionally comprises up to 10 percent by weight of a solvent.

7. A composition according to claim 5 which additionally comprises a catalyst inhibitor.

8. A composition suitable for use as a pressure sensitive adhesive and having in the cured state, a tack of greater than 200 g/cm² and a peel adhesion strength greater than 20 ounces/inch, which comprises:

(a) from 50 to 70 parts by weight of a solid, benzene soluble resin copolymer consisting essentially of $R_3SiO_{\frac{1}{2}}$ units and $SiO_{4/2}$ units where each R individually is a monovalent hydrocarbon radical containing no more than six carbon atoms, there being from 0.6 to 0.9 inclusive $R_3SiO_{\frac{1}{2}}$ units for every $SiO_{4/2}$ unit, at least 95 percent of all R radicals in (a) being methyl and the total number of R radicals in (a) that have olefinic unsaturation being 0–0.5 percent of all R radicals in (a), (b) from about 30 to about 50 parts by weight of an essentially cyclic free, polydiorganosiloxane of the average formula $$CH_2=CH(R_2{}^1SiO)_mR_2{}^1Si\,CH=CH_2$$

where each $R^1$ individually is a radical selected from the group consisting of methyl, ethyl, propyl, and phenyl, at least 95 percent of all $R^1$ radicals being methyl, and m has an average value such that the viscosity of the polydiorganosiloxane (b) has a value of from 500 to 10,000 centipoises at 25° C., the total of (a) and (b) being 100 parts by weight;

(c) an amount of an organopolysiloxane which is at least partially soluble in the mixture of (a) and (b) and having an average unit formula $$R^3{}_aH_bSiO_{(4-a-b)/2}$$

where each $R^3$ individually is any $R^1$ radical as defined above, a has a value of from 0.05 to 1.00, the sum of a plus b being from 1.10 to less than 3.00, there being an average of greater than two silicon bonded hydrogen atoms per molecule of (c), no silicon atom bearing more than one silicon bonded hydrogen atom and the amount of (c) present being sufficient to provide from 1.0 to 30.0 silicon bonded hydrogen atoms for every olefinically unsaturated radical in the total of (a) plus (b) and, (d) a platinum containing catalyst in sufficient quantity to provide at least 0.1 part by weight of platinum for every one million parts by weight of the combined weight of (a), (b), and (c).

9. A composition according to claim 8 wherein substantially all R radicals in (a) are methyl.

10. A composition according to claim 8 which comprises from 55 to 65 parts by weight of benzene soluble resin copolymer (a) and from 35 to 45 parts of polydiorganosiloxane (b).

11. A composition according to claim 8 wherein the organopolysiloxane (c) comprises a linear liquid polysiloxane which contains at least two methylhydrogensiloxy groups.

12. A composition according to claim 8 wherein the platinum containing catalyst (d) is a thermally activated catalyst.

13. A composition according to claim 8 which additionally comprises up to 10 percent by weight of a solvent.

14. A composition according to claim 12 which additionally comprises a catalyst inhibitor.

15. A method which comprises:

first, preparing an organic solvent solution of (a) from 50 to 70 parts by weight of a solid, benzene soluble resin copolymer consisting essentially of $R_3SiO_{\frac{1}{2}}$ units and $SiO_{4/2}$ units where each R individually is a monovalent hydrocarbon radical containing no more than six carbon atoms, there being from 0.6 to 0.9 inclusive $R_3SiO_{\frac{1}{2}}$ units for every $SiO_{4/2}$ unit, at least 95 percent of all R radicals in (a) being methyl and the total number of R radicals in (a) that have olefinic unsaturation being 0–0.5 percent of all R radicals in (a), (b) from 30 to 50 parts by weight of an essentially cyclic free, polydiorganosiloxane of the average formula $$CH_2=CH(R_2^1SiO)_mR_2^1Si\ CH=CH_2$$

where each $R^1$ individually is a radical selected from the group consisting of methyl, ethyl, propyl, and phenyl, at least 95 percent of all $R^1$ radicals being methyl, m has an average value such that the viscosity of the polydiorganosiloxane (b) has a value from 500 to 10,000 centipoises as 25° C. the total of (a) and (b) being 100 parts by weight;

second, removing organic solvent from the solution to obtain a devolatilized mixture containing no more than about 10 percent by weight, based on the total weight of devolatilized mixture, of organic solvent, third, mixing with the devolatilized mixture (c) an amount of an organopolysiloxane which is at least partially soluble in the mixture of (a) and (b) and having an average unit formula $$R^3{}_aH_bSiO_{(4-a-b)/2}$$

where each $R^3$ individually is any $R^1$ radical as defined above, a has a value of from 1.00 to less than 2.00, b has a value of from 0.05 to 1.00, the sum of a plus b being from 1.10 to less than 3.00, there being an average of greater than two silicon bonded hydrogen atoms per molecule of (c), no silicon atom bearing more than one silicon bonded hydrogen atom and the amount of (c) present being sufficient to provide from 1.0 to 30.0 silicon bonded hydrogen atoms for every olefinically unsaturated radical in the total of (a) plus (b) and, (d) a platinum containing catalyst in sufficient quantity to provide at least 0.1 part by weight of platinum for every one million parts by weight of the combined weight of (a), (b), and (c).

16. The method of claim 15 wherein organic solvent is added to produce a composition with no more than 10 percent by weight, based on the total weight of the composition, of an organic solvent.

17. The method of claim 15 wherein the first organic solvent solution contains from 55 to 65 parts by weight of benzene soluble resin copolymer (a) and from 35 to 45 of polydiorganosiloxane.

18. As an article of manufacture, a solid support carrying on at least one surface thereof and the cured composition of claim 1.

19. A pressure sensitive adhesive tape comprising a flexible support carrying on at least one surface thereof and cured composition of claim 1.

20. A method which comprises:

first, preparing an organic solvent solution of (a) from 50 to 70 parts by weight of a solid, benzene soluble resin copolymer consisting essentially of $R_3SiO_{\frac{1}{2}}$ units and $SiO_{4/2}$ units where each R individually is a monovalent hydrocarbon radical containing no more than six carbon atoms there being from 0.6 to 0.9 inclusive $R_3SiO_{\frac{1}{2}}$ units for every $SiO_{4/2}$ unit, at least 95 percent of all R radicals in (a) being methyl and the total number of R radicals in (a) that have olefinic unsaturation being 0–0.5 percent of all R radicals in (a), (b) from 30 to 50 parts by weight of an essentially cyclic free, polydiorganosiloxane of the average formula $$CH_2=CH(R_2^1SiO)_mR_2^1Si\ CH=CH_2$$

where each $R^1$ individually is a radical selected from the group consisting of methyl, propyl, and phenyl, at least 95 percent of all $R^1$ radicals being methyl, m has an average value such that the viscosity of the polydiorganosiloxane (b) has a value from 500 to 10,000 centipoises as 25° C., the total of (a) and (b) being 100 parts by weight;

(c) an amount of an organopolysiloxane which is at least partially soluble in the mixture of (a) and (b) and having an average unit formula $$R^3{}_aH_bSiO_{(4-a-b)/2}$$

where each $R^3$ individually is any $R^1$ radical as defined above, a has a value of from 1.00 to less than 2.00, b has a value of from 0.05 to 1.00, the sum of a plus b being from 1.10 to less than 3.00, there being an average of greater than two silicon bonded hydrogen atoms per molecule of (c), no silicon atom bearing more than one silicon bonded hydrogen atom and the amount of (c) present being sufficient to provide from 1.0 to 30.0 silicon bonded hydrogen atoms for every olefinically unsaturated radical in the total of (a) plus (b), second, removing organic solvent from the solution to obtain a devolatilized mixture containing no more than about 10 percent by weight, based on the total weight of devolatilized mixture, of organic solvent, third, mixing with the devolatilized mixture (d) a platinum containing catalyst in sufficient quantity to provide at least 0.1 part by weight of platinum for every one million parts by weight of the combined weight of (a), (b), and (c).

21. The method of claim 20 wherein organic solvent is added to produce a composition with no more than 10 percent by weight, based on the total weight of the composition, of an organic solvent.

22. The method of claim 20 wherein the first organic solvent solution contains from 55 to 65 parts by weight of benzene soluble resin copolymer (a) and from 35 to 45 parts of polydiorganosiloxane.

* * * * *